United States Patent [19]

Ekman

[11] Patent Number: 4,779,645
[45] Date of Patent: Oct. 25, 1988

[54] COUPLING ARRANGEMENT

[76] Inventor: Thure Ekman, Slalomvägen 12, 541 33 Skövde, Sweden

[21] Appl. No.: 88,019

[22] Filed: Aug. 18, 1987

Related U.S. Application Data

[63] Continuation of Ser. No. 838,984, Mar. 12, 1986, abandoned.

[30] Foreign Application Priority Data

Mar. 13, 1985 [SE] Sweden .................. 8501235

[51] Int. Cl.$^4$ ............................................. F16L 37/28
[52] U.S. Cl. ........................... 137/614.03; 137/614.05; 285/27; 285/137.1
[58] Field of Search ................ 285/27, 28, 316, 137.1; 137/614.03, 614.05, 614

[56] References Cited

U.S. PATENT DOCUMENTS

| | | | |
|---|---|---|---|
| 2,765,181 | 10/1956 | Butterfield | 137/614.03 |
| 3,646,964 | 3/1972 | Strutman | 137/614.05 |
| 3,889,984 | 6/1975 | Lambiris | 285/27 |
| 3,907,338 | 9/1975 | Hayes, Jr. et al. | 285/137.1 |
| 4,303,098 | 12/1981 | Shindelar | 137/614.05 |
| 4,493,340 | 1/1985 | Weirich | 285/137.1 |
| 4,564,042 | 1/1986 | Ekman | 137/614.03 |

FOREIGN PATENT DOCUMENTS 1810282 11/1968 Fed. Rep. of Germany .
1937544 7/1969 Fed. Rep. of Germany .
2068069 8/1981 United Kingdom .

Primary Examiner—A. Michael Chambers
Attorney, Agent, or Firm—Pollock, Vande Sande & Priddy

[57] ABSTRACT

Each coupling component in a multiple coupling has a number of units arranged alongside one another. The component parts of the coupling units interact in pairs and in a compatible fashion with one another. Each unit includes a subordinate fluid channel and a device for opening and closing the fluid channel depending on the nature of its interaction with the corresponding unit in the other component. With the components in their connected position each pair of units constitutes through its fluid channels, a common essentially leak-free channel sealed off from the common channels formed by the other pairs of units. The components are arranged with guide balls and axial grooves, with the help of which the component parts can be connected together in one or more pre-determined rotational positions. One or both of the coupling components include a protective sleeve displaceable relative to the units of each component part and provided with an end part which contains transcurrent holes so that the protective sleeve in its initial position, tightly encloses the outer parts of the units. A multi-channel coupling can thus be executed rapidly and effectively, at the same time as the coupling can also be used in a dirty environment.

10 Claims, 3 Drawing Sheets

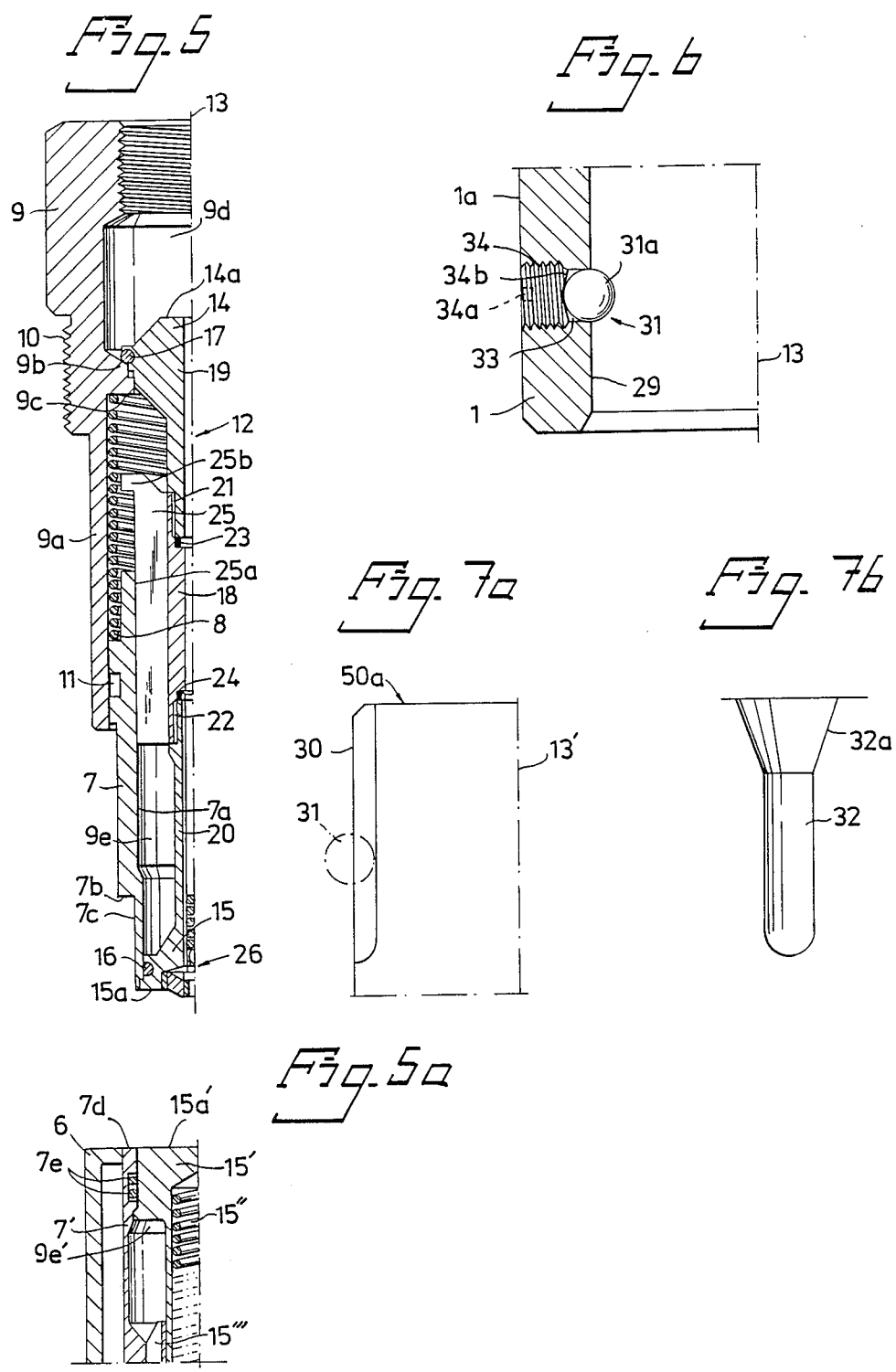

COUPLING ARRANGEMENT

This application is a continuation of application Ser. No. 838,984, filed Mar. 12, 1986 now abandoned.

TECHNICAL FIELD

The present invention relates to a coupling arrangement which comprises two male and female components capable of being connected together and disconnected.

BACKGROUND

Connectable and disconnectable couplings are available in many different types and in large numbers. The purpose of the couplings is to produce connections, for example hydraulic connections, in power transmission, supply and similar equipment. Various ways are known in the art for arranging the coupling components with protective sleeves which prevent the penetration of dirt, impurities and foreign particles to the inside of the coupling components. Also previously known in the art is the arrangement in which the coupling components are connected in various ways, for example in order to provide a quick connection function, using mechanical or hydraulic coupling accessories, etc.

DESCRIPTION OF THE PRESENT INVENTION

TECHNICAL PROBLEM

When making a number of connections the need arises to be able to simultaneously produce a rapid and effective and essentially leak-free connection. It is also convenient to arrange each coupling component so that it is also able to function in a contaminated and dirty environment.

THE SOLUTION

The object of the present invention is a coupling arrangement which solves the problem outlined above in which each component contains a number of units arranged alongside one another and when the components are connected together, they are able to interact with corresponding units in the other component. A further embodiment is that each unit is designed with a subordinate fluid channel and devices for opening and closing the fluid channel depending on the nature of the interaction with the corresponding element in the other component as the components are respectively connected and disconnected. A third embodiment is that each interacting pair of units in the components is arranged, with the components in their connected position, to constitute with their subordinate fluid channels a common channel which is essentially leak-free and sealed off from the common channels formed by the other pairs of units. A fourth embodiment is that the male and female components are arranged to permit their connection in pre-determined rotational positions. A further embodiment of the invention is that at least one, and preferably both of the components contains a protective sleeve capable of displacement relative to the units of each component and provided with an end part containing transcurrent holes arranged so that, with the protective sleeve in an initial position, the end part tightly encloses the outer parts of the units and/or devices.

The protective sleeve is preferably arranged for displacement against the effect of a spring action. In addition, the outer surface of the end part and the end surfaces of the units are arranged as to constitute an essentially flat end surface on the coupling component in question.

In a preferred embodiment the female component contains guide balls which project into a guide surface for the male component situated on the female component. The male component is provided with guide grooves which interact with spherical components on each guide ball. The guide balls are equally distributed around the circumference and are at least three in number. At each guide point along the circumference two or more balls may be arranged one after the other in the longitudinal direction of the female component. Each guide ball is preferably arranged in a hole which discharges at the guide surface on the female component via an opening having a diameter smaller than that of the guide ball. Each guide ball is retained in holes by a locking device, for example a locking screw, which may be provided with a bowl-shaped surface through which the locking device is able to interact with the guide ball.

Each unit in the male and/or female component can be provided with pressure elimination devices arranged to facilitate their connection.

ADVANTAGES

According to the present invention, it is possible for two or more connections to be made simultaneously and effectively with the help of the coupling components. Where a large number of fluid channels is present, connection of the coupling components takes place with the help of hydraulic, mechanical or equivalent coupling devices of a previously known kind. The units, which are arranged in series or in parallel with one another, are arranged so that each common channel can be leak-free. If pressure elimination devices are arranged in the unit concerned or in both units in each unit groove, then it is possible to considerably reduce the connecting forces. The specially designed protective sleeve provides an effective seal in each component when in the unconnected position, and the sleeve can be arranged so it is actuated against the effect of only a single spring device.

BRIEF DESCRIPTION OF DRAWINGS

A preferred embodiment of an arrangement which exhibits the significant characteristic features of the invention is now described below with simultaneous reference to the accompanying drawings, in which:

FIG. 5 shows in longitudinal section a unit contained in the female coupling component intended to be arranged in the female coupling component alongside units of identical construction;

FIG. 5a shows in longitudinal section those parts of the unit in accordance with FIG. 5 which differ from the units contained in the male coupling component in accordance with FIGS. 3 and 4;

FIG. 6 shows in longitudinal section details of the manner in which the female coupling component contains a guide ball for the male component; and FIGS. 7a–7b show how the male component is executed with axial grooves via which the male component is able to interact with said guide ball.

BEST MODE OF CARRYING OUT THE INVENTION

The female component 1 is provided with a number, being six in the case illustrated, of units 2 arranged, in parallel and of identical construction. The female component 1 contains a protective flap 3 with an end part 3a which is described in greater detail below.

Figure 3:
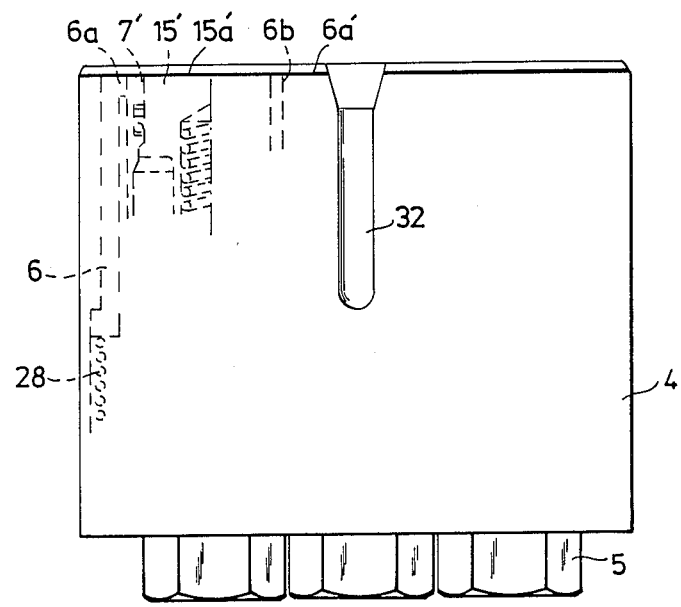
FIG. 3 shows a side view of a male component contained in a multiple coupling.

FIG. 3 shows a male component 4 provided with a number of units 5 arranged in parallel which is present in a multiple coupling. The number of units 5 in the male component corresponds to the number of units in the female component. The male component can also be provided with a protective flap 6, on which the end part is indicated by 6a.

The units in the male and female components are compatible and are constructed so that the free ends of the units differ in accordance with the following. FIG. 5 shows the construction of each unit in the female component, and FIG. 5a shows the principle of construction of each unit in the male component.

Each unit in the female component contains an inner sleeve or a sealing sleeve 7 which is capable of longitudinal displacement. The inner sleeve 7 is caused by a cylindrical spring 8 to move towards its sealing position.

The case 9 is provided with a hollow, cylindrical-shaped part 9a, on the outside of which a thread 10 is arranged. Running on the inside of part 9 is sleeve 7, which is provided with a space 11 for seals (not shown) which seal the outside of the sleeve against the inner surface of the part 9a.

Arranged centrally with in the female coupling component is a unit 12 which is capable of longitudinal displacement in its longitudinal direction. The longitudinal axis of the unit coincides with the longitudinal axis 13 of the case. The unit has at its first end a first sealing component 14, and at its second end a second sealing component 15. The first sealing component 14 interacts with a fixed seat 9b on the case. The second sealing component 15 interacts with the sealing sleeve 7 to provide a sealing function, as will be appreciated from the Figure. The second sealing component exhibits a sealing device 16 (not shown). The sealing device on the first sealing component is indicated by the reference designation 17.

The unit 12 is made up of three components. A first component consists of an intermediate component 18 and two outer components 19 and 20. The outer component 19 supports the sealing component 14, and the outer component 20 supports the sealing component 15. Each outer component can be attached to the intermediate component by threads 21 and 22. In one embodiment components 18, 19 and 20 are sealed one against the other by seals 23, 24 of a previously known kind. Components 18, 19 and 20 constitute a hub component which supports the sealing components 14 and 15 at their respective ends.

The intermediate component/hub component is provided with projecting, wing-shaped elements. These center the unit 12 in the female coupling component and are three or more in number. The elements 25 run along the entire longitudinal extent of the intermediate component or parts of the longitudinal extent of the hub component. In the embodiment illustrated, edge surfaces 25a of the elements 25 run along the inner surface 7a of the inner sleeve 7. The disc-shaped elements are made with stop devices 25b which interact with an internal stop surface 9c on the case 9. The stop devices face towards the inside of the spring 8. In accordance with FIG. 1 the sealing sleeve 7 for the female components is reduced at its free end so that a rim 7b is formed.

The unit is made with a central, transcurrent channel which is described in more detail below and which extends between the end surfaces 14a and 15a of the sealing components 14 and 15. The unit has one or more pressure eliminating devices 26 by which fluid can be passed from a space 9d and down towards the other end of the unit, or vice versa.

Each unit in the male component can be made in a previously known manner (see, for example, GB No. 2068069). The units for the male component, in accordance with FIGS. 3 and 5a, contain a component 7' which interacts with sleeves 3 and 7 which encloses a valve body or a sealing component 15' which is capable of axial displacement relative to the component 7'. The component 15' is displaced against the action of the spring 15''. The component 7' is supported in the unit in in a crossed arm arrangement 15'''. The component 7' is made with a large internal diameter so that, when the end surfaces 15a and 15a' on the sealing components 15 and 15' are brought together, it encloses the outer surface 7c on the sealing sleeve 7. During the connection procedure the end surface 7d on the component 7' is brought into interaction with the rim 7b on the sealing sleeve 7. As the connection procedure continues the sealing sleeve 7 and the component 15' are pushed inwardly into each of the coupling components so that internal subordinate fluid channels are opened and connected to form a common channel. The sleeve 7' is provided with internally positioned sealing devices 7e which may be of a previously known kind. Alternatively or in addition the sleeve may be provided with an external sealing device of an appropriate kind, not shown here. The subordinate fluid channel in the unit in accordance with FIG. 5 is indicated by the reference designation 9e, and the subordinate fluid channel in the unit in accordance with FIG. 5a is indicated by the reference designation 9e'. The unit in accordance with FIG. 5 can be provided with pressure elimination devices 26, or alternatively may lack such pressure elimination devices, which may in turn be positioned in the unit in accordance with FIG. 5a.

As the end surfaces 15a and 15a' are brought together, pressure eliminating device 6 is forced inwardly and opens the ball in the longitudinal inner passageway, which allows fluid to flow through the passageway and pressure relief to occur in the space 9d. Due to the pressure elimination function the connection forces for connecting components 1 and 4 can be reduced considerably. In accordance with FIG. 1, the protective flap 3 is shown in the position in which it is actuated by spring 27. In this end position the end component 3a encloses the outer components of the sealing sleeve 7 and the sealing component 15. In this embodiment, end surface 3a' coincides essentially with the end surface 15a to form a common and essentially flat surface. It is possible in principle to cause the sealing sleeve to be situated inside the end component 3a, which means that only the sealing component 15 will be enclosed. Alternatively, the sealing sleeve may be reduced only partially, in which case both 15 and 17 will be enclosed. In FIG. 2 there are six units uniformly distributed around the circumference are shown. The number of units and their positioning may, of course, be varied. The female component is provided with a flange 1a which projects outside the common end surface 3a' and 15a. The protective sleeve 3 is made with a stop heel 3b which defines the end position of the protective sleeve.

Each unit is screwed into the case of the female component 1 by external thread 10, which is screwed into a corresponding in accordance with FIG. 3, protective flap 6 in the male component.

Figure 1:
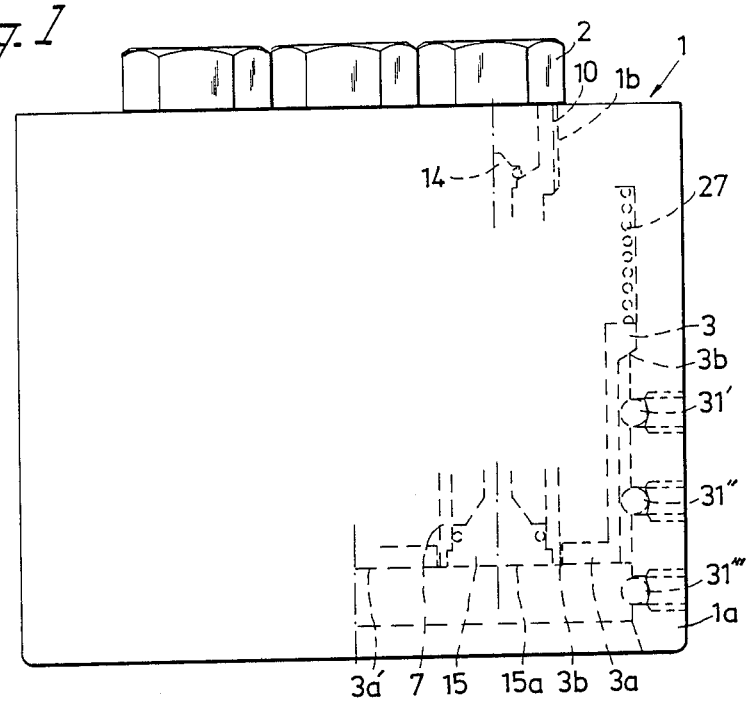
FIG. 1 shows a view from the side of a female component contained in a multiple coupling.
Figure 2:
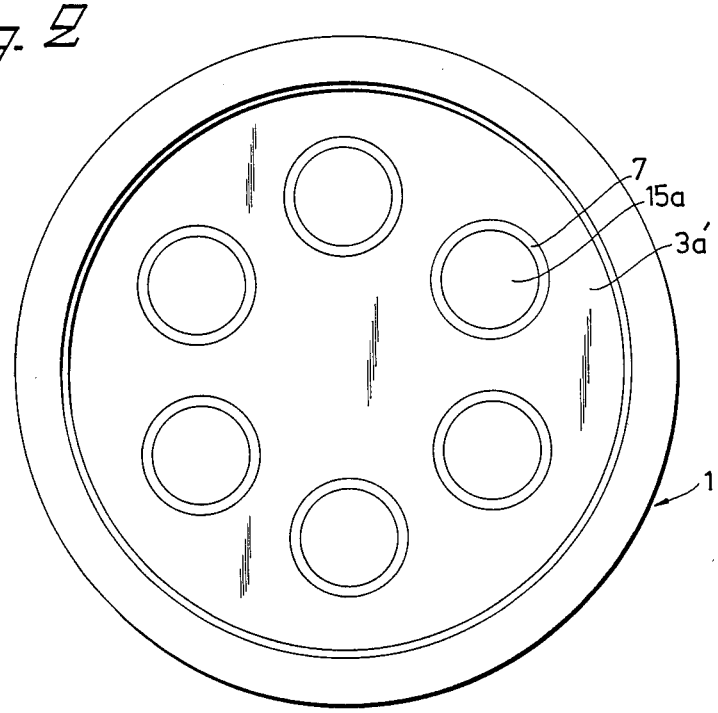
FIG. 2 shows an end view of the female coupling component in accordance with FIG. 1.

The protective flap 6 in the male component in accordance with is constructed in a similar fashion to the protective flap 3 in FIG. 1. The cylindrical spring is indicated by the reference designation 28. The attachment of the units 5 is similar to that of units 2 of FIG. 1. In this case, the end surfaces 15a' and 6a' form a common essentially flat end surface. The end surfaces on the sealing sleeve 7' also form part of the common surface. FIGS. 6, 7a and 7b show mutual guide surfaces 29 and 30 between the female and male components. This coupling also incorporates a guide function at the guide surfaces so that the coupling components can be given certain rotated positions relative to one another about their respective longitudinal axes 13 and 13'. Thus, the female component is provided with one or more guide balls 31 which interacts with corresponding axial guide grooves in the male component. Each guide ball is arrangged in a hole 32 in the fixed sleeve 2 of the female component. The hole discharges at the guide surface 29 via an opening which is smaller than the diameter of the guide ball 31. The latter will accordingly project above the guide surface 29 with a spherical part 31a, at the same time as it is retained in the hole 33. Each ball is retained in its respective hole 33 by means of a plug 34 which may have the form of a screw provided with an external thread which interacts with a corresponding internal thread inside the hole 33. The screw is provided with a screw slot 34a. The part of the screw which interacts with the ball is provided with angled or curved surfaces 34b which match the form of the ball. The head of the screw is preferably recessed into the surface 1a of the sleeve 1. Preferably three or more balls are distributed evenly around the circumference of the guide surface 29.

Figure 4:
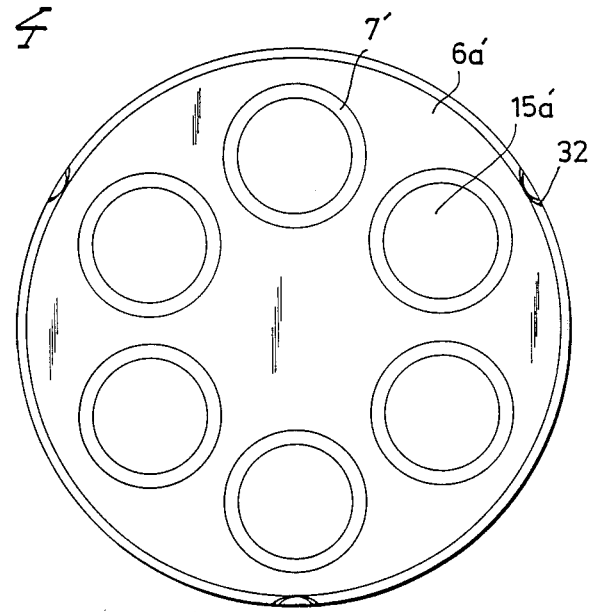
FIG. 4 shows the male coupling component in accordance with FIG. 3.

The male component is provided with a corresponding number of axial grooves 32. The grooves are preferably widened at the end surface 3a of the male component with parts 32a. The widened parts can be conformal and may serve to facilitate the guidance of the male and female components into their correct relative angles of rotation. Depending on the positioning of the units in the horizontal section, the component parts may be brought together in one or more pre-determined rotational positions. In the case illustrated it is possible for the components to be brought together in any of three different relative rotational positions. In accordance with FIGS. 3 and 4, three axial grooves 32 are evenly distributed around the periphery of the male component. As shown in FIG. 1, it is also possible for two or more balls to be positioned one after the other at the same point on the periphery. In FIG. 1 three balls 31', 31" and 31''' are positioned one after the other. The outer ball 31''' is arranged in the flange 1a, and acts as the initial guide.

FIG. 5 shows the unit in a fully closed position. In the case of a connection with a compatible unit in the male component the sleeves 3 and 7 are longitudinally displaced against the action of their respective springs. In addition the components 14 and 15 are axially displaced inwardly by the longitudinal displacement of the unit 12 in each coupling component from the position shown in FIG. 1 towards the stop surface 9c. Corresponding displacement of the sleeve 6 and the component 15' in the male component also takes place. In accordance with FIG. 3, sealing component 14 is raised from a sealed position and into a fully open position allowing fluid to flow from the space 9d and down between the wings 25 and onwards, or in the opposite direction by displacement of the unit. As the sleeve 7 and the component 15' are displaced longitudinally, the seal between the sealing component 15 and the sleeve 7 and the component 15' and the component 7' respectively is released, resulting in the fluid passageway opening in this area leading into the male component on the outside of the component 15' and between the wings of the crossed arm arrangement 15'''. The unit 18, 19 and 20 which is longitudinally displaced, is positioned so that at least small rotational movements can be made about its longitudinal axis 13, which is also true of the sleeve 7. Longitudinal displacement movements and interacting surfaces, are arranged so that full opening of each of the common channels will exist with the components in their connected position.

The invention is not restricted to the embodiment illustrated above by way of example, but may undergo modification within the context of the following Patent Claims and the idea of invention.

I claim:

1. A coupling member comprising male and female components capable of being connected and disconnected, each component including a plurality of units arranged alongside one another and capable of interacting with corresponding units in the other component when said components are connected, at least said units in said female component, are each provided with an external thread and screwable into a corresponding internal thread in a case of said female component thereby being individually removable from said female component, each unit being provided with a subordinate fluid channel and devices for opening and closing said subordinate fluid channel as the components are respectively connected and disconnected, each interacting pair of units in said component being arranged to constitute with their subordinate fluid channels when said components are connected, a common leak-free channel, said common channel being sealed off from common channels formed by the other pairs of units, said male and female components being capable of interconnecting in at least one predetermined rotational position, at least one component being provided with a single common protective sleeve for said plurality of units, said sleeve including a disc-like end part with a plurality of transcurrent holes for receiving said plurality of said units and tightly enclosing the outer parts of said units of said component, said sleeve being movable with respect to said units of said component.

2. A coupling member according to claim 1, wherein said protective sleeve in each component is capable of displacement overcoming the effect of spring devices.

3. A coupling member according to claim 2, wherein the outer surface and the end surface of said components constitute together a substantially flat common surface.

4. A coupling member according to claim 1 or 3, wherein said female component is provided with plurality of guide balls projecting into a guide surface for the male component, said male component including corresponding axial guide grooves for interacting with said guide balls.

5. A coupling member according to claim 4, wherein each guide ball is arranged in a hole which discharges at the guide surface through an opening having a diameter smaller than that of the guide ball.

6. A coupling member according to claim 5, wherein said guide ball is retained in said hole by a locking device, having an essentially bowl-shaped surface capable of interacting with said guide ball.

7. A coupling member according to claim 4 wherein said guide balls are evenly distributed around the internal circumference of said female component, and the number of said axial grooves in said female component corresponds to the number of said guide balls.

8. A coupling member according to claim 4, wherein said female component is provided with at least three guide balls, and at least two of said guide balls are positioned one after the other in the longitudinal direction of said female component.

9. A coupling member according to claim 7 wherein at least one of each pair of interacting units is provided with pressure eliminating devices.

10. A coupling member according to claim 9 wherein both interacting units are provided with pressure eliminating devices.

* * * * *